United States Patent
Thompson et al.

(10) Patent No.: US 6,814,532 B1
(45) Date of Patent: Nov. 9, 2004

(54) SELF-UNLOADING, BOTTOM DISCHARGE TRAILER

(75) Inventors: Jeffrey B. Thompson, Seward, NE (US); James E. Kassian, Columbus, NE (US)

(73) Assignee: Timpte, Inc., David City, NE (US)

(*) Notice: Subject to any disclaimer, the term of this patent is extended or adjusted under 35 U.S.C. 154(b) by 0 days.

(21) Appl. No.: 10/430,524

(22) Filed: May 5, 2003

(51) Int. Cl.[7] .................................................. B60P 1/00
(52) U.S. Cl. ........................ 414/502; 414/523; 414/528
(58) Field of Search .............................. 198/313, 632; 414/502, 523, 528

(56) References Cited

U.S. PATENT DOCUMENTS

| | | | |
|---|---|---|---|
| 2,834,487 A | * 5/1958 | Gaddis | 414/523 |
| 3,521,767 A | * 7/1970 | Rossi | 414/523 |
| 3,684,255 A | * 8/1972 | Rossi | 414/523 |
| 3,917,084 A | 11/1975 | Swisher, Jr. et al. | |
| 4,530,429 A | 7/1985 | Erickson | |
| 5,443,351 A | * 8/1995 | Pettijohn | 414/523 |
| 6,059,372 A | 5/2000 | McDonald et al. | |
| 6,068,103 A | 5/2000 | Werner | |
| 6,447,238 B1 | * 9/2002 | Brown | 414/502 |

* cited by examiner

Primary Examiner—Joseph Valenza
(74) Attorney, Agent, or Firm—Swanson & Bratschun, LLC

(57) ABSTRACT

A self-unloading, bottom-discharge trailer and a discharge conveyor therefore, are provided. In a working position, the discharge conveyor transports material from a trailer container upwards beyond the rear of the trailer for depositing into storage. In a transport position, a rear section of the discharge conveyor is folded downwards into a substantially vertical position, resting against the rear of the trailer frame and not substantially protruding beyond the back of the trailer. The frame may include a recess sized to accommodate the rear section such that the rear section is substantially flush with the rear of the frame. Consequently, the trailer may remain in compliance with highway safety regulations.

9 Claims, 8 Drawing Sheets

SELF-UNLOADING, BOTTOM DISCHARGE TRAILER

FIELD OF THE INVENTION

The present invention relates generally to bottom-discharge semi-trailers and, more particularly, to semi-trailers with integrated unloading and discharge conveyors.

BACKGROUND OF THE INVENTION

A common piece of equipment used in the course of transporting agricultural commodities and many other bulk materials is a "bulk commodity" semi-tractor trailer. These trailers may be approximately 42 feet in length with side walls between 66 inches and 84 inches in height. They typically have a rectangular shaped open top and have sloped internal surfaces that direct the material contained within to smaller openings in the bottom of the trailer which are used to discharge the material. Such trailers, as illustrated in FIG. 1, are generally referred to as bottom-discharge or "hopper" trailers and are typically unloaded by opening a door that covers the bottom of the opening at the bottom of the trailer. The material then falls freely into an auger or a pit at an elevator.

Although some trailers have been built which have an attached device to move the material away from the bottom of the trailer, such trailers are not common yet common. FIG. 2 illustrates one type of trailer 200 which includes a bottom conveyor 202 which receives material discharged from a discharge opening 204 and transports it to the back 206 of the trailer. The bottom conveyor is mounted horizontally under the trailer body. The material is then deposited onto an auger, onto another conveyor or into a pit and moved into storage.

FIG. 3 illustrates another trailer 300 which includes both a bottom conveyor 302 and a discharge conveyor 304. The bottom conveyor 302 received material from the discharge opening, transports it rear-ward and deposits it onto the discharge conveyor 304. The discharge conveyor 304 is rigidly mounted to the trailer 300 and transports the material at an angle upward beyond the back end of the trailer 300. The end 306 of the discharge conveyor 304 is approximately 11 feet above the ground and 13 feet behind the rear of the trailer 300. When the trailer is in transit, the angled discharge conveyor is typically pivoted to a lower position such that the end is approximately 8 feet above the ground and extends 15 feet behind the trailer.

Vehicles which travel the Federal Interstate System or the Federal Highway System are subject safety related legislation established by the Federal government. These are for the most part documented in the Federal Motor Vehicle Safety Standards (FMVSS) which publishes laws and regulations with which the manufacturers of motor vehicles must comply and similar Federal Motor Carrier Safety Regulations (FMCSR) with which all operators of motor vehicles must also comply. Of particular relevance are the regulations directed towards reducing the number of serious accidents in which a car, particularly a small car, in is in a "rear underride" incident. In such an accident, the car impacts the rear of a tractor-trailer and slides underneath the trailer, being crushed in the process. Regulations, such as those published in Title 49 of the Code of Federal Regulations, Sections 571.223 and 224, have been enacted which require certain trailers to have rear impact guards attached to the chassis to prevent a car from sliding under the vehicle. Among other requirements, a rear impact guard must be mounted so that its rear surface is no more than a prescribed distance (currently 305 millimeters) forward of the vertical plane of the rear extremity of the vehicle. In the event that the rear-most axle of the trailer is permanently fixed and located within the prescribed distance (305 mm) of the rear extremity of the vehicle (a "wheels back" configuration), the rear axle may serve as the rear impact guard.

It will be apparent that the discharge conveyor of the trailer of FIG. 3 does not comply with the Regulations because the conveyor extends the rear extremity of the trailer to such an extent that the distance between the rear impact guard, even in a wheels back configuration, and the rear extremity is greater than the prescribed distance. Thus, if a car impacted the rear of such a trailer, the discharge conveyor would strike and penetrate the passenger compartment before the car could be stopped by the rear impact guard. Even though the discharge conveyor may be removable, a substantial amount of time and effort is necessary for its removal. Consequently, as a practical matter, an operator is not likely to remove the discharge conveyor before moving the trailer on roads and highways and therefore the trailer will not be in compliance with the Regulations and will pose a significant danger to the traveling public.

FIG. 4 illustrates another discharge conveyor 404 (in the form of a chute) for a trailer 400. The conveyor 404 is hinged, allowing the discharge end 406 to fold back and down against the trailer 400 when not in use. Although the conveyor 404 does not extend behind the trailer 400 as does the conveyor 304 in FIG. 3, it is still not in compliance with the Regulations and therefore poses a significant danger to the traveling public.

Consequently, there remains a need for a self-unloading, bottom-discharge trailer which can be transported on roads and highways without violating highway safety regulations and presenting a danger to motorists.

SUMMARY OF THE INVENTION

The present invention provides a discharge conveyor extension for a self-unloading, bottom-discharge trailer. In a working position, the discharge conveyor transports material from a trailer container upwards beyond the rear of the trailer for depositing into storage. In a transport position, a rear section of the discharge conveyor is folded downwards into a substantially vertical position, resting against the rear of the trailer frame and not substantially protruding beyond the back of the trailer.

In one embodiment, a self-unloading, bottom-discharge trailer is provided with a discharge conveyor. In a working position, the discharge conveyor transports material from a trailer container upwards beyond the rear of the trailer for depositing into storage. In a transport position, a rear section of the discharge conveyor is folded downwards into a substantially vertical position, resting against the rear of the trailer frame and not substantially protruding beyond the back of the trailer. The frame may include a recess sized to accommodate the rear section such that the rear section is substantially flush with the rear of the frame. Consequently, the trailer may remain in compliance with highway safety regulations.

DETAILED DESCRIPTION OF THE INVENTION

Figure 1:
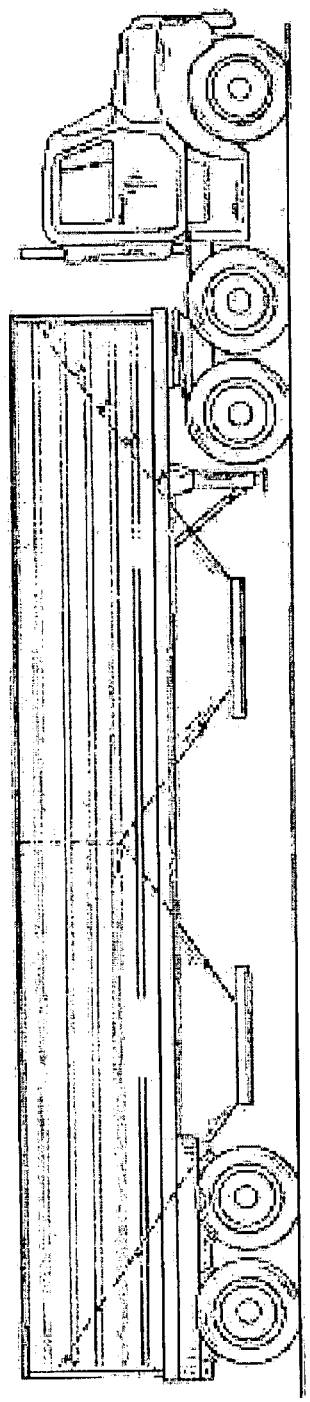
FIG. 1 illustrates a prior art bottom-discharge trailer.
Figure 2:
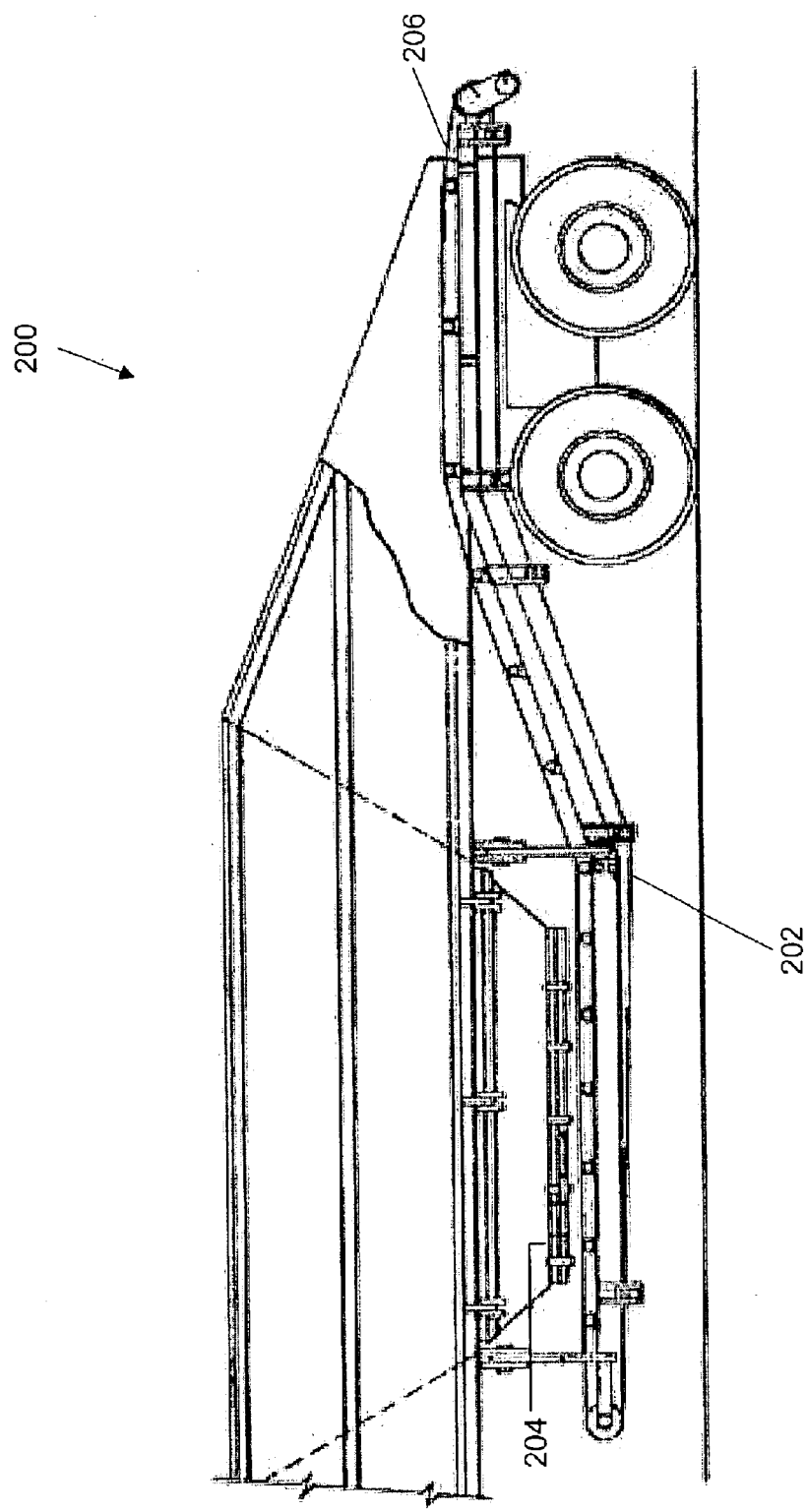
FIG. 2 illustrates the back portion of a prior art bottom-discharge trailer with an integrated unloading conveyor.
Figure 3:
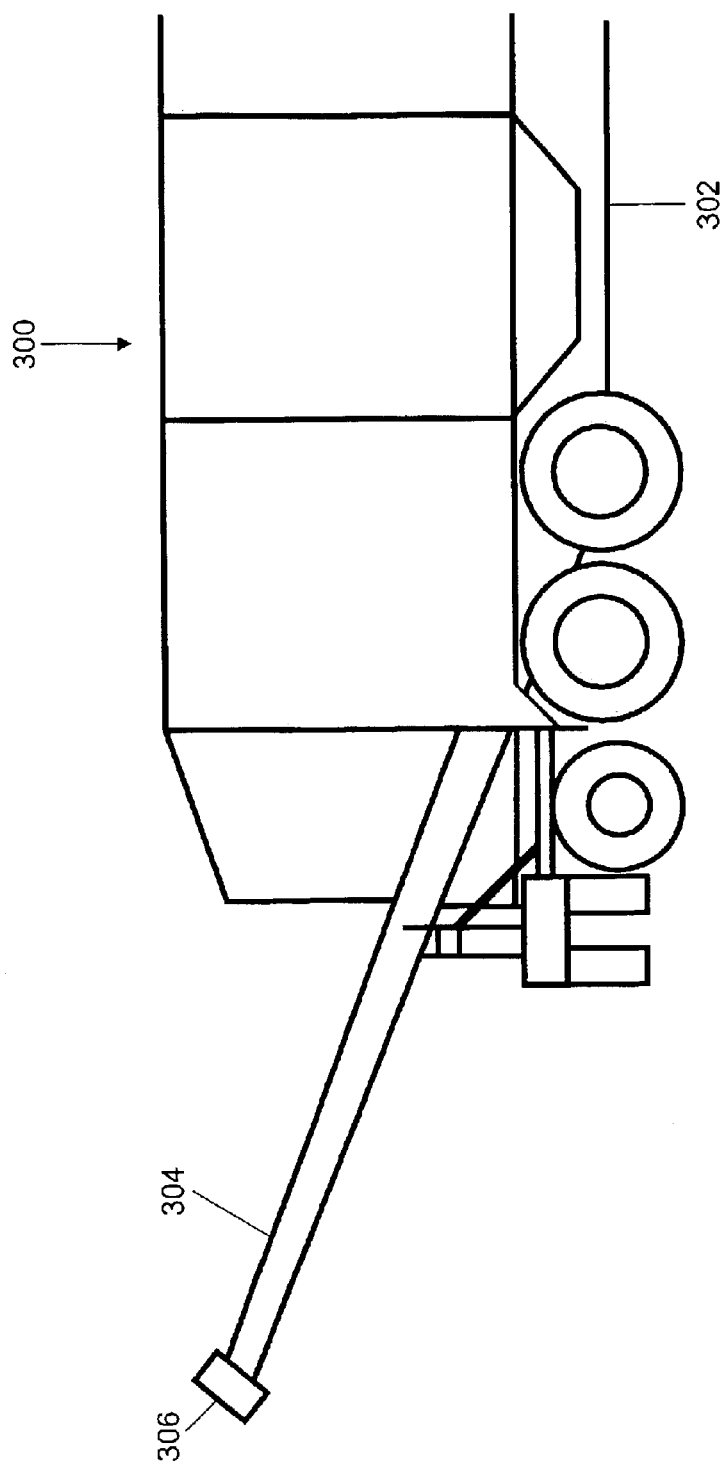
FIG. 3 illustrates a prior art bottom-discharge trailer with an integrated unloading conveyor and fixed discharge conveyor.
Figure 4:
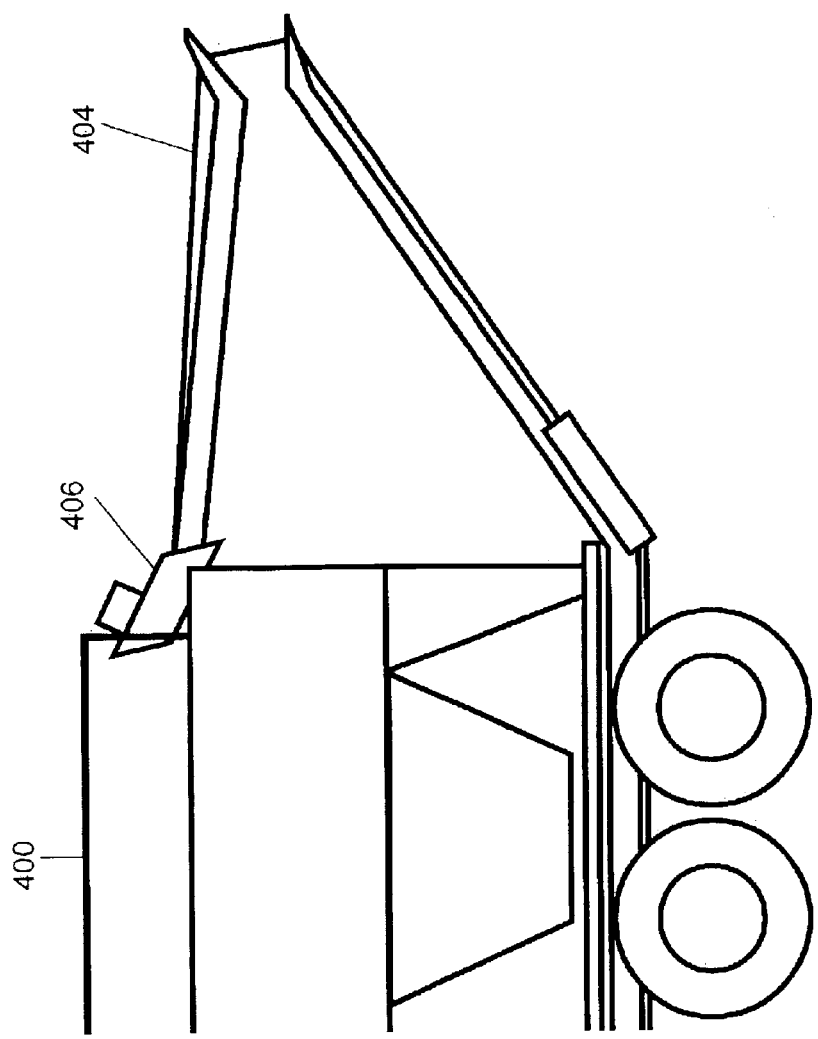
FIG. 4 illustrates the back end of a prior art trailer with a foldable discharge conveyor.
Figure 5:
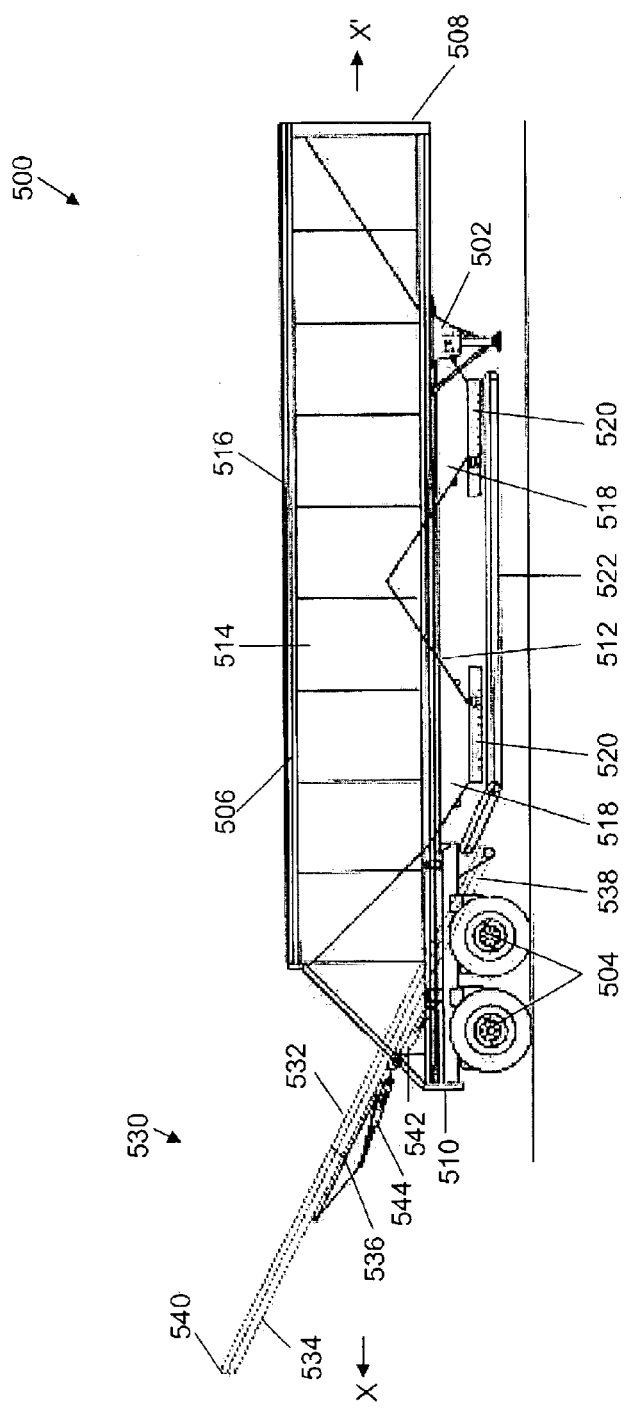
FIG. 5 illustrates a bottom discharge trailer of the present invention with the discharge conveyor in a working position.

FIG. 5 illustrates a bottom discharge trailer 500 of the present invention. The trailer 500 includes a frame 502, extending along a primary axis X-X', to which are attached axles and wheels 504 and a container 506. The frame 502 has a front end 508, which is connectable to a tractor (not shown), and a rear face 510. The container 506 includes a bottom 512 and sidewalls 514. The top 516 may be open or covered. The inside of the container 506 may have one or more sloped hoppers 518, each with an opening 520 to discharge material loaded into the container 506. The trailer 500 preferably includes a bottom conveyor 522 mounted to the frame 502 underneath the container 506 and parallel to the primary axis X-X'. The bottom conveyor 522 receives material from the discharge openings 520 and transports it towards the rear of the trailer 500.

The trailer 500 of the present invention further includes a discharge conveyor 530 which is connected to the frame 502. The discharge conveyor 530 is shown in FIG. 5 in a working position. The discharge conveyor 530 is comprised of a forward section 532 and a rear section 534, connected with a hinge 536 such that the rear section 534 may be folded downward. The front end 538 of the forward section 532 is connected to the frame 502, preferably in a pivotable manner, and operatively coupled to the rear end of the bottom conveyor 522 such that material being transported on the bottom conveyor may be deposited onto the forward section 532 of the discharge conveyor 530 for further transport to the rear end 540 of the discharge conveyor 530.

In the working position, the forward and rear sections 532 and 534 of the discharge conveyor 530 are contiguous and operatively coupled to permit material to be transferred from the forward section to the rear section. They extend from underneath the back end of the container 506 rearward and upwardly at an angle to permit the end 540 to be approximately 11 feet above the ground and approximately 13 feet beyond the rear face 510 of the trailer 510. A first hydraulic cylinder 542 is coupled between the frame 502 and the forward section 532 for raising and lowering the discharge conveyor 530.

Figure 6:
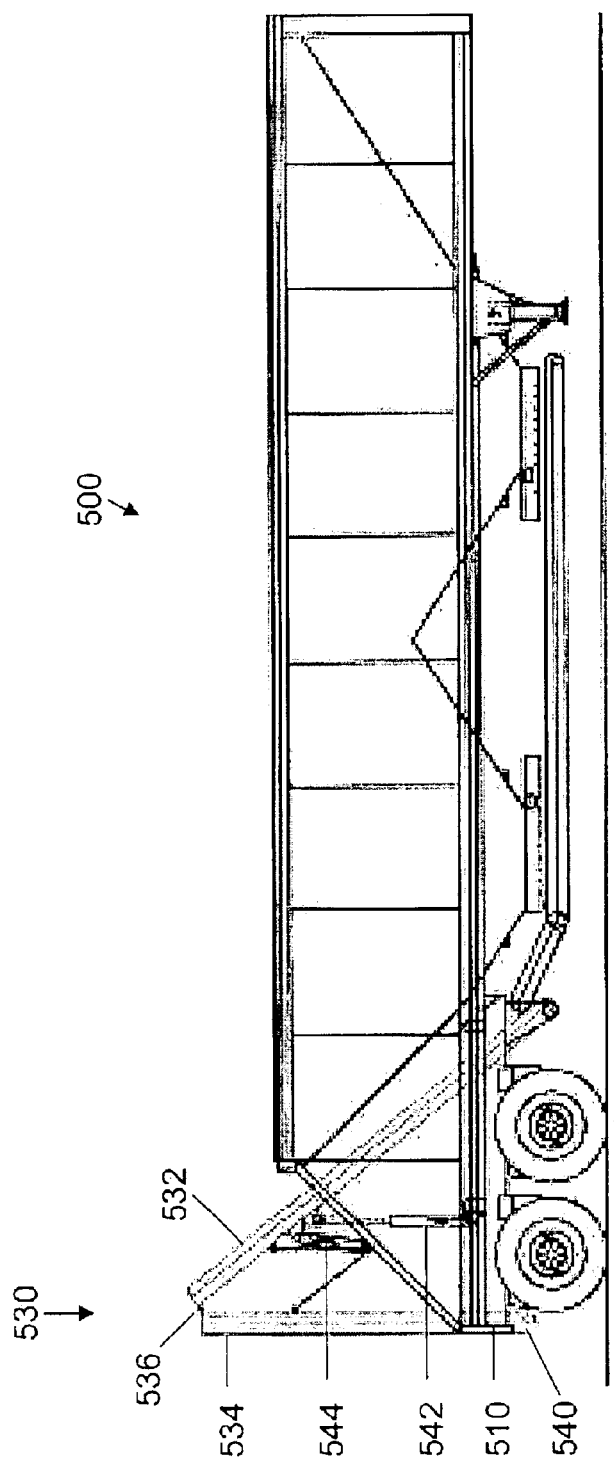
FIG. 6 illustrates a bottom discharge trailer of the present invention with the discharge conveyor in a transport position.

FIG. 6 is an illustration of the discharge conveyor 530 in a transport position. A second cylinder 544 is coupled between the forward and rear sections 532 and 534 of the discharge conveyor 530 for folding and extending the rear section 534. One end of the second hydraulic cylinder is pivotably coupled to the forward section 532 and the other end is pivotably coupled to two rods in a four-bar linkage configuration. It will be appreciated that the forward and rear sections 532 and 534 may be connected in other ways. While still allowing the rear section to fold downwards. To place the discharge conveyor in the transport position from the working position, the second hydraulic cylinder 544 is operated to retract its piston. The rear section 534 then folds downward until it is substantially vertical and resting against the rear face 510 of the frame 502. If desired, the first hydraulic cylinder 542 may also be operated to raise the forward section 532 and enable the rear section 534 to assume a vertical position.

Figure 7:
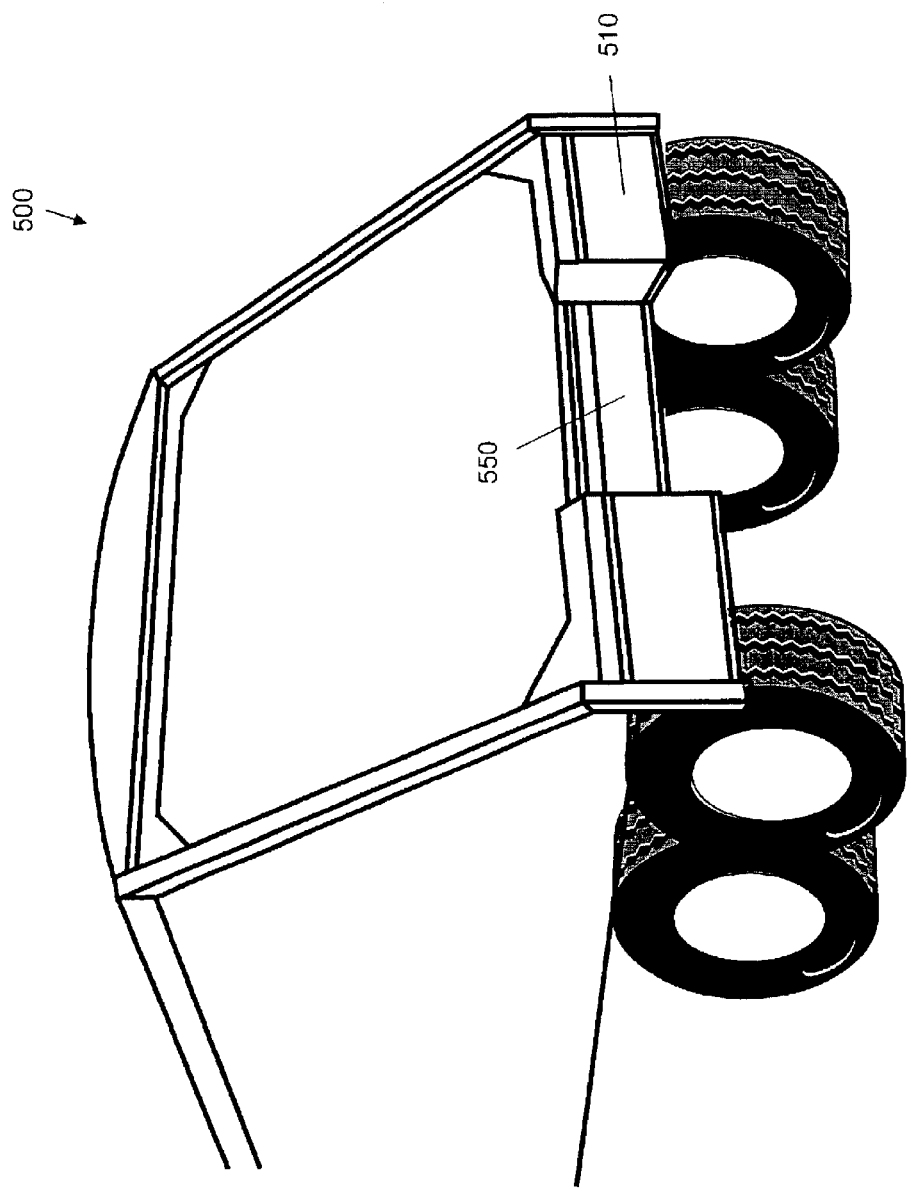
FIG. 7 illustrates the back end of one embodiment of the trailer of the present invention.
Figure 8:
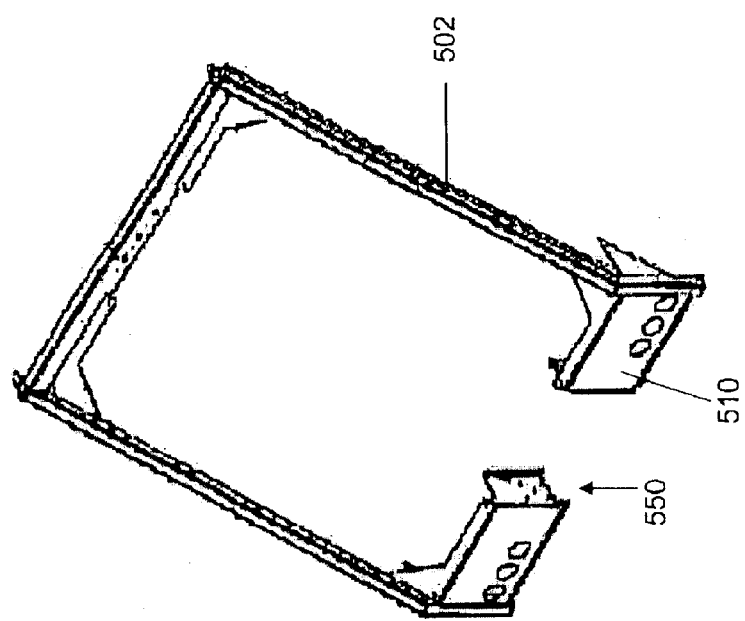
FIG. 8 is a view of the recess in the rear portion of the frame of the trailer of FIG. 7.

In one embodiment of the trailer 500 of the present invention, the rear section 534 is flush with the rear face 510. FIG. 7 is a perspective view of the back end of the trailer 500. A recess 550 is formed in the rear face 510 of the frame 502. The depth and width of the recess 550 are approximately the same as the depth and width of the rear section 534 of the discharge conveyor 530 such that, when the discharge conveyor 530 is in the transport position, the rear section 534 does not substantially extend beyond the rear face 510. FIG. 8 illustrates a portion of the frame 502 with the recess 550.

Because the discharge conveyor 530 does not substantially extend beyond the rear face 510 of the frame 502 of the trailer 500 when in the transport position, it does not cause any part of the trailer 500 to be located more than the prescribed distance from the rear impact guard. The trailer 500 is, therefore, in full compliance with current regulations.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A bottom-discharge trailer, comprising:
   a wheeled frame connectable at a front end to a tractor, the wheeled frame extending along a primary axis;
   a container mounted to the frame for retaining material therein, the container being defined by a bottom and sidewall, the bottom having at least one closable discharge opening and the sidewall having a rear face;
   a discharge conveyor unit, the discharge conveyor having a forward section connected to the frame and a rear section, hingeably connected to the forward section; and
   a bottom conveyor unit mounted to the frame under the container and parallel to the primary axis, positioned to receive the material discharged from the at least one discharge opening and transport the material for deposit on the discharge conveyor unit;
   the discharge conveyor unit being configurable between:
      a working position in which the forward section and the rear section are substantially contiguous and extend angularly upward in a rearward direction whereby the material is lifted by the discharge conveyor unit to a predetermined height above the bottom of the body and a predetermined distance beyond the rear face of the container, and
      a transport position in which the rear section is folded substantially vertically downward, whereby the back end of the discharge conveyor unit does not extend substantially beyond the rear face of the container; and
   the frame having a recess formed in a rear face sized to accommodate the rear section of the discharge conveyor unit when the discharge conveyor unit is in the transport position, whereby a surface of the back end of the discharge conveyor unit is substantially flush with the back end of the frame.

2. The trailer of claim 1, the discharge conveyor unit further comprising a first hydraulic cylinder pivotably coupled between the forward and rear sections of the discharge conveyor unit for pivoting the rear section about the hinged connection, whereby:

when the discharge conveyor unit is in the working position, a piston of the first hydraulic cylinder is is extended; and when the discharge conveyor unit is in the transport position, the piston of the first hydraulic cylinder is retracted.

3. The trailer of claim 1, the discharge conveyor unit further comprising:

a first hydraulic cylinder pivotably coupled between the forward and rear sections of the discharge conveyor unit for pivoting the rear section about the hinged connection; and a second hydraulic cylinder for raising and lowering the discharge conveyor unit, the second hydraulic cylinder pivotably coupled between a back end of the frame and the forward section of the discharge conveyor unit;

whereby:

when the discharge conveyor unit is in the working position, a piston of the first hydraulic cylinder is extended and a piston of the second hydraulic cylinder is retracted; and when the discharge conveyor unit is in the transport position, the piston of the first hydraulic cylinder is retracted and the piston of the second hydraulic cylinder is extended.

4. The trailer of claim 3, further comprising a four-bar linkage pivotably coupling the first hydraulic cylinder between the forward and rear sections of the discharge conveyor.

5. The trailer of claim 4, wherein:

a first end of the first hydraulic cylinder is pivotably coupled to the forward section of the discharge conveyor; and the four-bar linkage comprises:

a first rod having a first end pivotably coupled to a second end of the first hydraulic cylinder and a second end pivotably coupled to the forward section of the discharge conveyor unit; and a second rod having a first end pivotably coupled to the second end of the first hydraulic cylinder and a second end pivotably coupled to the rear section of the discharge conveyor unit.

6. The trailer of claim 1, wherein:

the trailer further comprises a rear impact guard; and when the discharge conveyor unit is in the transport position, no part of the discharge conveyor unit is more than a prescribed distance from the rear impact guard.

7. The trailer of claim 6, wherein the prescribed distance from the rear impact guard is a distance prescribed by federal safety regulations.

8. The trailer of claim 6, wherein the prescribed distance from the rear impact guard is 305 millimeters.

9. The trailer of claim 6, wherein the prescribed distance is measured from a rear-most surface of rear tires affixed to the frame.

\* \* \* \* \*